US011343578B2

(12) United States Patent
Ganuthula

(10) Patent No.: US 11,343,578 B2
(45) Date of Patent: May 24, 2022

(54) CONTENT MANAGEMENT AND PLAYBACK CONTROL

(71) Applicant: Charter Communications Operating, LLC, St. Louis, MO (US)

(72) Inventor: Kiran Reddy Ganuthula, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 25 days.

(21) Appl. No.: 16/846,875

(22) Filed: Apr. 13, 2020

(65) Prior Publication Data

US 2021/0321168 A1  Oct. 14, 2021

(51) Int. Cl.
*H04N 21/84* (2011.01)
*H04N 21/472* (2011.01)
*H04N 21/6587* (2011.01)
*H04N 21/44* (2011.01)
*G06V 20/40* (2022.01)

(52) U.S. Cl.
CPC ....... *H04N 21/47217* (2013.01); *G06V 20/41* (2022.01); *H04N 21/44008* (2013.01); *H04N 21/6587* (2013.01); *H04N 21/84* (2013.01)

(58) Field of Classification Search
None
See application file for complete search history.

(56) References Cited

U.S. PATENT DOCUMENTS

| 2003/0122966 | A1* | 7/2003 | Markman | ........ H04N 21/47214 348/563 |
|---|---|---|---|---|
| 2004/0045020 | A1 | 3/2004 | Witt et al. | |
| 2010/0329547 | A1 | 12/2010 | Cavat | |
| 2013/0163864 | A1 | 6/2013 | Cavat | |
| 2017/0046595 | A1 | 2/2017 | Dwan et al. | |
| 2020/0068253 | A1* | 2/2020 | Kim | .................. G06K 9/00744 |
| 2020/0213673 | A1* | 7/2020 | Major | .............. H04N 21/44204 |

* cited by examiner

*Primary Examiner* — Cai Y Chen
(74) *Attorney, Agent, or Firm* — Armis IP Law, LLC

(57) ABSTRACT

According to one configuration, video analyzer hardware receives a first episode of video content and a second episode of video content from a content series. The video analyzer hardware produces metadata. The metadata marks segments of the second episode of video content that are to be skipped during playback of the second episode of video content to a user following playback of the first episode of video content to the user. The video distribution hardware uses the metadata to produce a playlist and control playback of the video in accordance with the metadata. During playback of the first episode of video content followed by the second episode of video content, the playback device displays a message to the user. The message requests the user to indicate whether to skip over playback of a portion of the first episode of video content.

30 Claims, 12 Drawing Sheets

METADATA
150-1

| SEASON-EPISODE | VIDEO TYPE | DURATION | CONFIDENCE VALUE |
|---|---|---|---|
| S1E1 | PREVIEW (A1) | START = T10, STOP = T11 | 75% |
| | CORE (A2) | START = T11, STOP = T12 | 65% |
| | CREDITS (A3) | START = T12, STOP = T13 | 95% |
| S1E2 | RECAP (B1) | START = T20, STOP = T21 | 45% |
| | CORE (B2) | START = T21, STOP = T22 | 90% |
| | CREDITS (B3) | START = T22, STOP = T23 | 55% |
| S1E3 | RECAP C1 | START = T30, STOP = T31 | 60% |
| | CORE (C2) | START = T31, STOP = T32 | 40% |
| | CREDITS (C3) | START = T32, STOP = T33 | 85% |

METADATA
150-2

| SEASON-EPISODE | VIDEO TYPE | DURATION | CONFIDENCE VALUE |
|---|---|---|---|
| S1E1 | PREVIEW | START = T10, STOP = T11 | 75% |
|  | CORE | START = T11, STOP = T12 | ~~65%~~ 85% |
|  | CREDITS | START = T12, STOP = T13 | 95% |
| S1E2 | RECAP | START = T20, STOP = T21 | ~~45%~~ 90% |
|  | CORE | START = T21, STOP = T22 | 90% |
|  | CREDITS | START = T22, STOP = T23 | ~~55%~~ |
| S1E3 | RECAP | START = T30, STOP = T31 | 60% |
|  | CORE | START = T31, STOP = T32 | ~~40%~~ 75% |
|  | CREDITS | START = T32, STOP = T33 | 85% |

CONTENT MANAGEMENT AND PLAYBACK CONTROL

BACKGROUND

It is well-known that one or more conventional computer processing devices such as computers, set top boxes, televisions, etc., can be operated to play back content for viewing. For example, a user can provide input to a set top box to initiate playback of corresponding content on a television display screen. The content can be streamed from any suitable resource such as from a DVR, from a selected broadcast channel, on-demand channel, over-the-top channel, etc.

During playback operation, the user is typically able to apply different types of playback commands to control playback of the respective streaming content. For example, in certain instances, the user can apply rewind commands (including skip back commands) to change a current playback location of the content to an earlier playback time; the user can apply fast forward commands (such as a skip forward command or fast playback command) in order to quickly move a current playback location to a later point in time.

In certain instances, video content includes different types of material. For example, video content may include a preview or recap, core scenes, and credit information.

BRIEF DESCRIPTION OF EMBODIMENTS

The present disclosure includes the observation that most conventional streaming content often includes undesirable portions (such as previews, recap content, credits, etc.) that consumers, may wish to skip viewing. Additionally, this disclosure includes the observation that streaming content may also include desirable portions that consumers may wish to view.

Embodiments herein provide a way for users to more easily control playback of different types of content over one or more episodes.

More specifically, embodiments herein include a system comprising a video analyzer resource, video distribution resource, and video playback resource. The video analyzer resource (such as hardware and/or software) receives a first episode of video content and a second episode of video content from a content series. The video analyzer resource produces metadata classifying different segments of content in the multiple episodes. Based on the metadata, the video distribution resource identifies segments metadata, of the second episode of video content that are potentially skipped during playback of the second episode of video content to a user following playback of the first episode of video content to the user.

Further embodiments herein include, via the video analyzer resource (such as an analyzer engine), determining which of the segments are to be skipped in the second episode of video content during playback to the viewer based on a comparison of scenes in the second episode of video content to scenes in the first episode of video content. In one embodiment, scenes that are duplicated (or truncated as a summary) can be marked in the metadata/playlist for being skipped.

In accordance with further example embodiments, the video analyzer resource receives scene selection criteria specifying a particular type of video content to be skipped during playback of multiple episodes such as playback of the second episode of video content following playback of the first episode of video content. Based on detected portions of the second episode of video content that are of a type as specified by the scene selection criteria, the video analyzer resource produces the metadata or a playlist to indicate the portions of the second episode of video content to be skipped during playback of the second episode of video content following playback of the first episode of video content.

As previously discussed, the system as described herein further includes a video distribution resource (such as video distribution hardware and/or video distribution software). In such an instance, the video distribution resource distributes the metadata to the user or uses the metadata to control playback of desired portions of multiple episodes of video content. In one embodiment, during playback of the first episode of video content followed by the second episode of video content on a playback device, the playback device displays a message to the user. The message requests the user to provide input indicating whether to skip over a portion of the first episode of video content.

In accordance with still further embodiments, producing the metadata and marking segments of the second episode of video content that are to be skipped includes: detecting segments of video content in the second episode of video content as being a recap or preview of corresponding segments of video content in the first episode of video content.

In yet further example embodiments, the video analyzer resource receives a third episode of video content from the content series in addition to receiving the first episode in the second episode. The video analyzer resource produces metadata and/or control information marking segments of the third episode of video content that are to be skipped during playback of the third episode of video content to a viewer following playback of the second episode of video content to the viewer.

In accordance with further example embodiments, producing the metadata and marking segments of the second episode of video content that are to be skipped includes: detecting that the marked segments of video content in the third episode of video content is a recap of corresponding segments of video content in the second episode of video content.

Still further embodiments herein include, via the video analyzer resource, receiving playback commands applied to and during playback of the second episode of video content and utilizing the playback commands to modify timing of the marked segments as specified by the metadata, the modified timing adjusting corresponding portions of the second episode of video content to be skipped during playback.

Note that the metadata (or playlist) as described herein can be configured to indicate any number of segments to be skipped during playback. For example, in one embodiment, the generated metadata specifies a first segment of content in the first episode of video content to be skipped during playback of the first episode; the generated metadata specifies a second segment of content in the first episode of video content to be skipped during playback of the first episode; and so on.

In accordance with further example embodiments, the video analyzer resource produces a confidence value indicating a degree to which a start time associated with the first segment of content represents video content of a particular type.

The confidence value can be generated in any suitable manner. In one nonlimiting example embodiment, the video analyzer resource receives feedback of playback commands applied to and during playback of the second episode of video content; and based on the received feedback, the video analyzer resource adjusts a magnitude of the confidence value.

In yet further example embodiments, the video analyzer resource produces the metadata to indicate attributes of each of the segments of content in the first episode of video content and the second episode of video content.

Still further example embodiments include, via the video analyzer resource, receiving program information (such as including text, images, etc.) associated with the first episode and the second episode. The program information includes text, images, etc., pertinent to the first episode and the second episode. In one embodiment, the video analyzer resource uses the text, images, etc., from the program information to classify/identify different types of video segments in the first episode and the second episode.

Further embodiments herein include a video analyzer resource that applies scene classification criteria to an episode of video content from a content series. The scene classification criteria specify different scenes of interest (or not of interest) to a user. During application of the scene selection criteria, the video analyzer resource delineates timing of different types of content segments in the episode of video content for playback. The video analyzer resource then produces metadata classifying the different segments in the episode of video content. Thus, in one embodiment, the video analyzer resource produces the metadata to classify the different segments in the episode of video content.

In accordance with further example embodiments, the video analyzer resource receives input from a user indicating scenes of interest in the episode of video content. The video analyzer resource creates a playlist to control playback of the episode of video content on a playback device.

In one embodiment, controlling playback of the episode of video content on the playback device includes, via generated metadata, identifying first scenes in the episode of video content that match a type as specified by the input. A respective playback device sequentially plays back the identified multiple scenes in the episode of video content on a display screen, skipping playback of scenes not specified by the input.

In accordance with further example embodiments, the video analyzer resource produces playback control information from the metadata; the playback control information indicates non-contiguous scenes in the episode of video content to playback on a playback device.

Embodiments herein are useful over conventional techniques. For example, as previously discussed, embodiments herein provide a way of categorizing/classifying different portions of content associated with each video episode in a video episode sequence. Categorization/classification as described herein enables duration of content and skipping of undesirable content during playback. Additionally, categorization/classification enables a respective user to choose the portions of content are to be played back (or filtered out) on a respective playback device.

These and other more specific embodiments are disclosed in more detail below.

Note that any of the resources as discussed herein can include one or more computerized devices, mobile playback devices, servers, base stations, wireless playback equipment, playback management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or other a medium such as firmware in one or more ROM, RAM, PROM, etc., and/or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage media and/or a system having instructions stored thereon to facilitate selective playback of video content. For example, in one embodiment, the instructions, when executed by computer processor hardware, cause the computer processor hardware (such as one or more processor devices) to: receive a first episode of video content from a content series; receive a second episode of video content from the content series; analyze the first episode and the second episode; and identify segments of the second episode of video content that are to be skipped during playback of the second episode of video content to a user following playback of the first episode of video content to the user.

Yet another embodiment herein includes computer readable storage media and/or a system having instructions stored thereon to facilitate selective playback of video content. For example, the instructions, when executed by a respective processor device (computer processor hardware), cause a processor or multiple processors (computer processor hardware) to: apply scene classification criteria to an episode of video content from a content series, the scene classification criteria specifying different scenes of interest; during application of the scene selection criteria, delineate timing of different segments in the episode of video content for playback; and produce metadata, the metadata classifying the different segments in the episode of video content.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of content playback and specifically identification of desirable and undesirable portions of content. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 2 is an example diagram illustrating generation of metadata based on classifier criteria according to embodiments herein.

FIG. 3 is an example diagram illustrating updating of metadata and corresponding confidence values based on user feedback according to embodiments herein.

Figure 1:
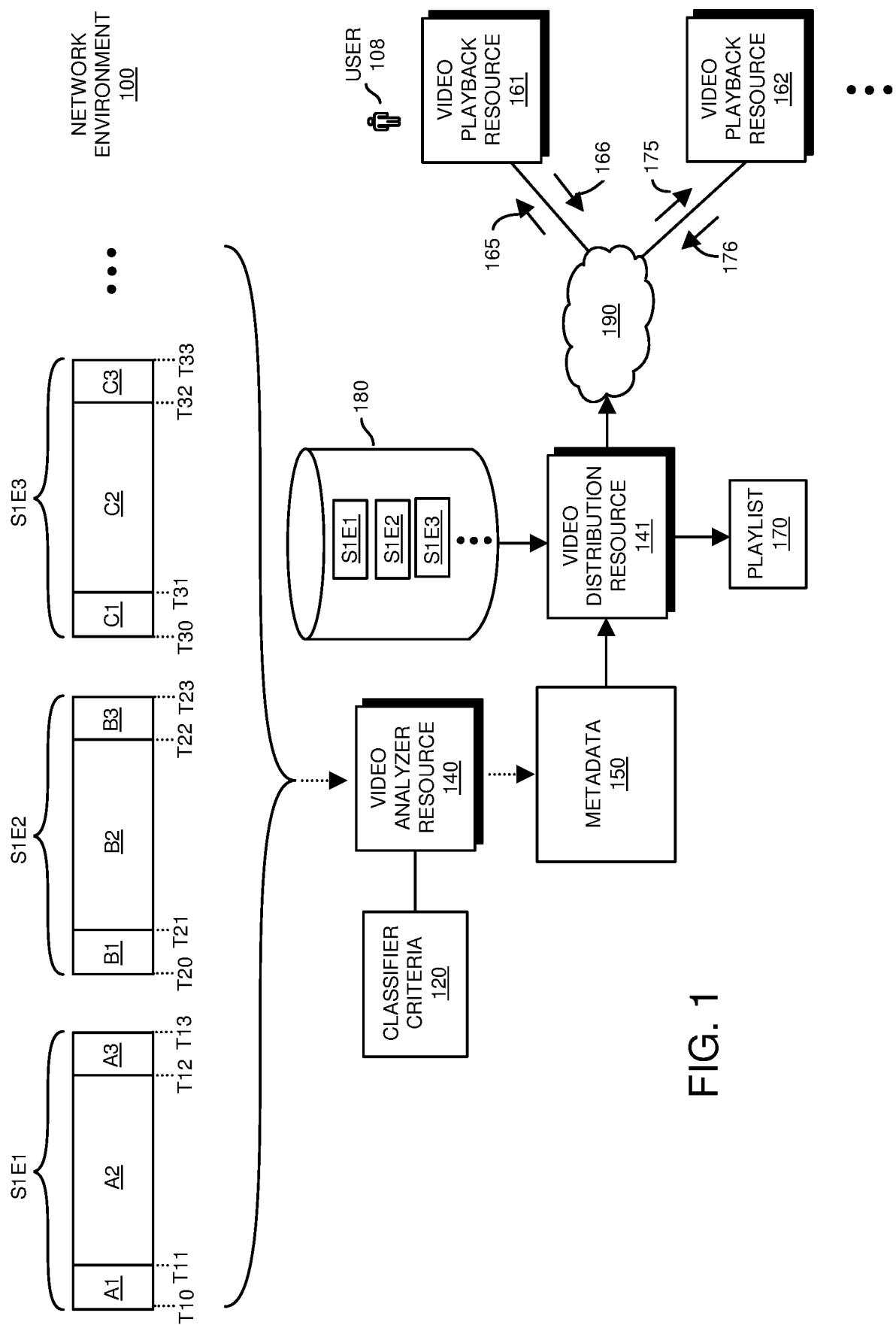
FIG. 1 is an example diagram illustrating a network environment including an analyzer resource and video distribution resource according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, embodiments herein include a video processing system/resource such as comprising a video analyzer resource, video distribution resource, and video playback resource. The video analyzer resource (such as hardware and/or software) receives a first episode of video content and a second episode of video content from a content series (such as a season of video episodes). The video analyzer resource produces metadata marking segments of the second episode of video content. In one embodiment, the video distribution resource derives a playlist from the metadata. The video distribution resource identifies portions of the multiple episodes that are to be skipped during playback of the second episode of video content to a user following playback of the first episode of video content to the user.

In accordance with further example embodiments, determination of the segments of video content that are to be skipped in a second episode of video content is based on a comparison of scenes in the second episode of video content to scenes in the first episode of video content. Scenes in the video content that are detected as being duplicates are marked in the metadata for being skipped.

In additional embodiments, the video analyzer resource (video processing resource) applies scene classification criteria to one or more episodes of video content from a content series. The scene classification criteria specifies different types of scenes of interest (or not of interest) to a user. During application of the scene selection criteria, the video analyzer resource delineates timing of different segments in the episode of video content for playback. The video analyzer resource then produces metadata classifying the different segments in the episode of video content. A video distribution resource uses the metadata to identify which user specified portions of the analyzed video content to distribute for playback to a playback device.

Note further that certain embodiments herein describe methods of skipping over sections of a content stream without the operator (viewer) knowing or caring what the respective section of content contains. For example, embodiments herein include automatically skipping playback of the recap & credit segments of one or more episodes during auto-playback of content.

Nowadays, all seasons and all video content episodes of almost every series are available in the video libraries of a majority of online streaming video service providers, binge watching of episodic content has increased substantially. While binge watching, as the viewer initiates contiguous playback of one episode to the next, the significance of a recap on the previous episode and the value of the credits part of the episode diminishes. Since the idea of binge watching is to view as many episodes as possible in the shortest span of time, a viewer typically prefers to skip the recap chapter as well as the credits chapter of each episode after the first one. Embodiments herein include an automated way of detecting the end of recap chapter and beginning of the credits chapter. The start & end times, and the duration of these chapters may vary along with the presentation styles.

One embodiment herein includes a new way to provide playback automation using machine learning. For example, in one embodiment, video source is fed into a scene detector which uses processing such as artificial intelligence to identify the scenes & chapter boundaries based on scene selection criteria and generate metadata describing the scene, start and end location of the identified scenes. If desired, the generated metadata includes an associated confidence level indicating how confident the scene detector determines that a certain scene & chapter boundary has been identified properly. The confidence level in this case is about the accuracy of when the end of recap chapter occurs and when the beginning of the credits chapter starts.

In accordance with further example embodiments, the scene selection criteria as described herein can be based on what is being shown (images), and what is being said (audio) in the respective content (audio and or video) played back. As an example, the determination of scene can include images of text, high-level flow, story, backdrop, sounds, dialogues, activity, color, tone, mood, loudness, brightness, smell, taste, etc.

In accordance with further example embodiments, the metadata is fed into a chapter data manager, which manages the chapter data & chapter boundary data. A video consuming device (playback device) such as a smartphone, tablet, personal computer, and set-top-Box retrieves the chapter data from the chapter data manager and directs the video streamer to start playing the video after the end of the recap chapter and until the beginning of the credits chapter, and then move on to the next episode, do the same, and so on. Optionally, the video consuming device can present the chapter data and let the viewer choose the option of playing the episode and starting a chapter of their choice.

Every time the chapter data (metadata identifying and classifying different types of segments) is presented to the viewer and the viewer takes an action, the video streamer provides feedback to the scene detector. The feedback indicates whether the viewer has accepted the chapter (video content segment) boundaries as-is, or whether they did a rewind or a fast-forward (i.e. trickmodes) on the video to reposition the start point of the video stream before they continued it for a while. This trickmode feedback loop, combined with machine learning as described herein, increases the accuracy of the scene detector and marking of different types of segments in the episodes over time.

Additionally, note that automatic skipping of recap & credit chapters during auto-playback of a next episode can be configurable in the user settings in a global fashion or configurable on a series-by-series fashion.

Now, more specifically, FIG. 1 is an example diagram illustrating a network environment according to embodiments herein.

As shown, network environment 100 (such as a content delivery network) includes a system comprising a video analyzer resource 140, video distribution resource 141, and one or more video playback resources 161 and 162 (such as one or more of a set top box, display screen, mobile communication device, personal device, etc.). Repository 180 stores one or more series of video content such as video content S1E1, video content S1E2, video content S1E3, etc. Network 190 supports connectivity of the playback devices 161 and 162 to the video distribution resource 141.

In general, as its name suggests, the video analyzer resource 140 processes one or more episodes (S1E1, S1E2, S1E3, etc.) of video content (having a particular title of content such as X-Factor) in repository 180 to produce metadata 150. In this example embodiment, the value S1 indicates season #1; the value E1 indicates episode #1 associated with season #1, the value E2 indicates episode #2 associate with season #1, the value E3 indicates episode #3 associated with season #1, etc.

Note that each of the different types of resources as described herein can be instantiated in any suitable manner. For example, video analyzer resource 140 can be implemented as video analyzer hardware, video analyzer software (such as executed instructions), or as a combination of video analyzer hardware and corresponding executed video analyzer software.

Video distribution resource 141 can be implemented as video distribution hardware, video distribution software (such as executed instructions), or as a combination of video distribution hardware and corresponding executed video distribution software.

Each of the video playback resources 161 and 162 can be implemented as video playback hardware, video playback software (such as executed instructions), or as a combination of video playback hardware and corresponding executed video playback software.

In one embodiment, during operation, the video analyzer resource 140 (such as hardware and/or software) receives: a first episode S1E1 of video content, a second episode of video content S1E2 from a content series in season #1 (S1), and a third episode of video content S1E3 from a specific video content series (such as Game of Thrones, X-Factor, The Gifted, etc.) in season #1 (S1).

In one embodiment, the second episode S1E2 of video content in the series of season S1 includes content that logically follows the video content in the first episode of video content S1E1; the third episode S1E3 of video content includes content that logically follows the video content in the second episode of video content S1E2; and so on.

As further shown, the video analyzer resource 140 produces metadata 150 based on analysis of the different episodes of video content in a season series. In one embodiment, analysis includes marking or classifying the different segments of the video content in the different episodes to indicate different portions based on type.

In this example embodiment, the video analyzer resource 140 receives classifier criteria 120 indicating different portions of video content to be tagged/identified in the multiple episodes.

Assume that the classifier criteria 120 indicates different portions of video content such as a recap/preview portion (such as a portion of video content at the beginning of the episode), core portion (such as a main portion of video content in the middle of the episode), and credits portions (such as a portion of video content at the end of the episode).

In such an instance, the core portions such as A2, B2, C2, etc., of respective episodes S1E1, S1E2, S1E3, etc., are the main portion of video content of interest to binge viewers that do not wish to view undesirable video content A1, A3, B1, B3, C1, C3, etc. (such as preview/recap or repetitive portions of video content across multiple episodes).

In accordance with further example embodiments, based on the metadata 150 indicating classification of the different segments of video content, the video distribution resource produces a respective playlist 170 that does not include content segments (such as video content B1, B3) of the second episode S1E2 of video content that are to be skipped during playback of the second episode of video content S1E2 to a user following playback of the first episode (all or a portion) of video content S1E1 to a respective user via a video playback resource 161 or 162. Further note that the playlist 170 does not include content segments in the third episode of video content S1E3 that are to be skipped during playback of the third episode of video content S1E3 to a user following playback of the second episode (all or a portion) of video content S1E2 to a respective user via a video playback resource.

Thus, in one embodiment, subsequent to classification/identification of the different portions of video content (such as segments A1, A2, A3 in video content S1E1; segments B1, B2, B3 in video content S1E2; segments C1, C2, C3 in video content S1E3; and so on) in a manner as previously discussed, embodiments herein include, via the video analyzer resource 140 and/or video distribution resource 141, determining which of the video segments in multiple episodes E1, E2, E3, etc., of season S1 video content are to be skipped. In one embodiment, scenes (such as images, audio, etc.) that are duplicated in the different episodes (or single episode) are marked in the metadata 150 and/or playlist 170 for being skipped over during playback.

FIG. 2 is an example diagram illustrating generation of metadata based on classifier criteria according to embodiments herein.

Based on analysis of the video content S1E1, S1E2, S1E3, etc., and corresponding different portions, and classifier criteria 120 such as PREVIEW, RECAP, CORE, and CREDITS, the video analyzer resource 140 (video processing resource such as video processing hardware and/or video processing software) produces metadata 150-1, tagging the different portions of content.

For example, based on analysis of audio and/or video in FIG. 1, the video analyzer resource 140 detects that the video content S1E1 includes RECAP/PREVIEW material (A1) between time T10 and time T11; the video analyzer resource 140 detects that the video content S1E1 includes CORE video material (A2) between time T11 and T12; the video analyzer resource 140 detects that the video content S1E1 includes CREDITS material (A3) between time T12 and T13.

Based on analysis of audio and/or video, the video analyzer resource 140 detects that the video content S1E2 includes RECAP/PREVIEW material (B1) between time T20 and time T21; the video analyzer resource 140 detects that the video content S1E2 includes CORE video material (B2) between time T21 and T22; the video analyzer resource 140 detects that the video content S1E2 includes CREDITS video material (B3) between time T22 and T23.

Based on analysis of audio and/or video, the video analyzer resource 140 detects that the video content S1E3 includes RECAP/PREVIEW material (C1) between time T30 and time T31; the video analyzer resource 140 detects that the video content S1E3 includes CORE video material (C2) between time T31 and T32; the video analyzer resource 140 detects that the video content S1E3 includes CREDITS video material (C3) between time T32 and T33.

Thus, as shown in FIG. 2, the video analyzer resource 140 produces the metadata 150 to indicate attributes of each of the segments of content in the different episodes of video content.

In accordance with further example embodiments, the video analyzer resource 140 produces a confidence value indicating a degree to which a start time and/or end time associated with each of the tagged portions of content.

For example, the video analyzer resource 140 generates a confidence value indicating a degree to which the identified start and end times are accurate in the metadata 150-1. In this example embodiment, the video analyzer resource 140 initially assigns a confidence value of 75% to start and end times (T10 and T11) associated with segment A1 (RECAP or PREVIEW material) associated with episode S1E1; the video analyzer resource 140 initially assigns a confidence value of 65% to start and end times (T11 and T12) associated with segment A2 (CORE material) associated with episode S1E1; the video analyzer resource 140 initially assigns a confidence value of 95% to start and end times (T12 and T13) associated with segment A3 (CREDITS material) associated with episode S1E1.

The video analyzer resource 140 initially assigns a confidence value of 45% to start and end times (T20 and T21) associated with segment B1 (RECAP/PREVIEW material) associated with episode S1E2; the video analyzer resource 140 initially assigns a confidence value of 90% to start and end times associated with segment B2 (CORE material) associated with episode S1E2; the video analyzer resource 140 initially assigns a confidence value of 55% to start and end times (T22 and T23) associated with segment B3 (CREDITS material) associated with episode S1E2.

The video analyzer resource 140 initially assigns a confidence value of 60% to start and end times (T30 and T31) associated with segment C1 (RECAP/PREVIEW material) associated with episode S1E3; the video analyzer resource 140 initially assigns a confidence value of 40% to start and end times associated with segment C2 (CORE material) associated with episode S1E3; the video analyzer resource 140 initially assigns a confidence value of 85% to start and end times (T32 and T33) associated with segment C3 (CREDITS material) associated with episode S1E3.

Note that the confidence value can be generated in any suitable manner. In one nonlimiting example embodiment, the video analyzer resource 140 (or other suitable entity) receives feedback of playback commands applied to and during playback of the first, second, third, etc., episodes of video content. Based on the received feedback, the video analyzer resource 140 produces the confidence values and/or adjusts respective magnitudes of the confidence values as further discussed below in FIG. 3.

FIG. 3 is an example diagram illustrating updating of metadata based on user feedback according to embodiments herein.

In one embodiment, the video analyzer resource 140 (or other suitable entity) receives notification of playback commands applied to and during playback of the second episode of video content and utilizes the playback commands to modify timing of the marked segments as specified by the metadata 150, increasing an accuracy of the timing information associated with segments and what they represent.

In one embodiment, the video analyzer resource knows which of the video playback resources requests playback without material such as A1, A3, B1, B3, C1, C3, etc., during playback of multiple episodes. In such an instance, when the video analyzer resource receives feedback indicating commands applied by respective viewers viewing episode S1E2 following playback of episode S1E1, the video analyzer resource detects playback commands that jump to playback at the beginning of B2 following playback of video content A2. The final playback location selected by a user via indication the commands indicates the beginning of video content B2.

Referring again to FIG. 1, assume that the respective user of video playback resource 161 requests to view multiple episodes in the season S1 including a selected title of content including S1E1, S1E2, S1E3, etc. The user of video playback resource 161 indicates to playback respective video content without RECAP/PREVIEW or CREDITS.

In response to receiving a further request from the video playback resource 161 to view the video content without RECAP or CREDITS material, the video analyzer resource 140 and/or video distribution resource 141 produces the playlist 170. In one embodiment, in accordance with the requested video content, using the metadata 140, the video distribution resource 141 produces the playlist 170 to indicate to playback a contiguous sequence of video content (video stream) including segment A2, followed by playback of segment B2, followed by playback of segment C2, and so on, without playback of segments A1, A3, B1, B3, C1, C3, etc.

Note that the video distribution resource 141 can be configured to communicate the requested video content (i.e., curated content) via communications 165 in any suitable manner. For example, the video distribution resource 141 can be configured to use the playlist 170 to retrieve the appropriate segments of content A2, B2, C2, etc., (filtering out A1, A3, B1, B3 C1, C3) and stream such content (in a contiguous manner such as via a transport stream) to the video playback resource 161.

Alternatively, the video distribution resource 141 can be configured to communicate the playlist 170 to video playback resource 161. In such an instance, the video playback resource 161 uses the playlist 170 to individually retrieve the respective segments of content A2, B2, C2, etc., from the video distribution resource 141. More specifically, the video distribution resource 141 retrieves the requested segments of content from repository 180 and communicates such content over network 190 to the respective requesting video playback resource 161.

Figure 4:
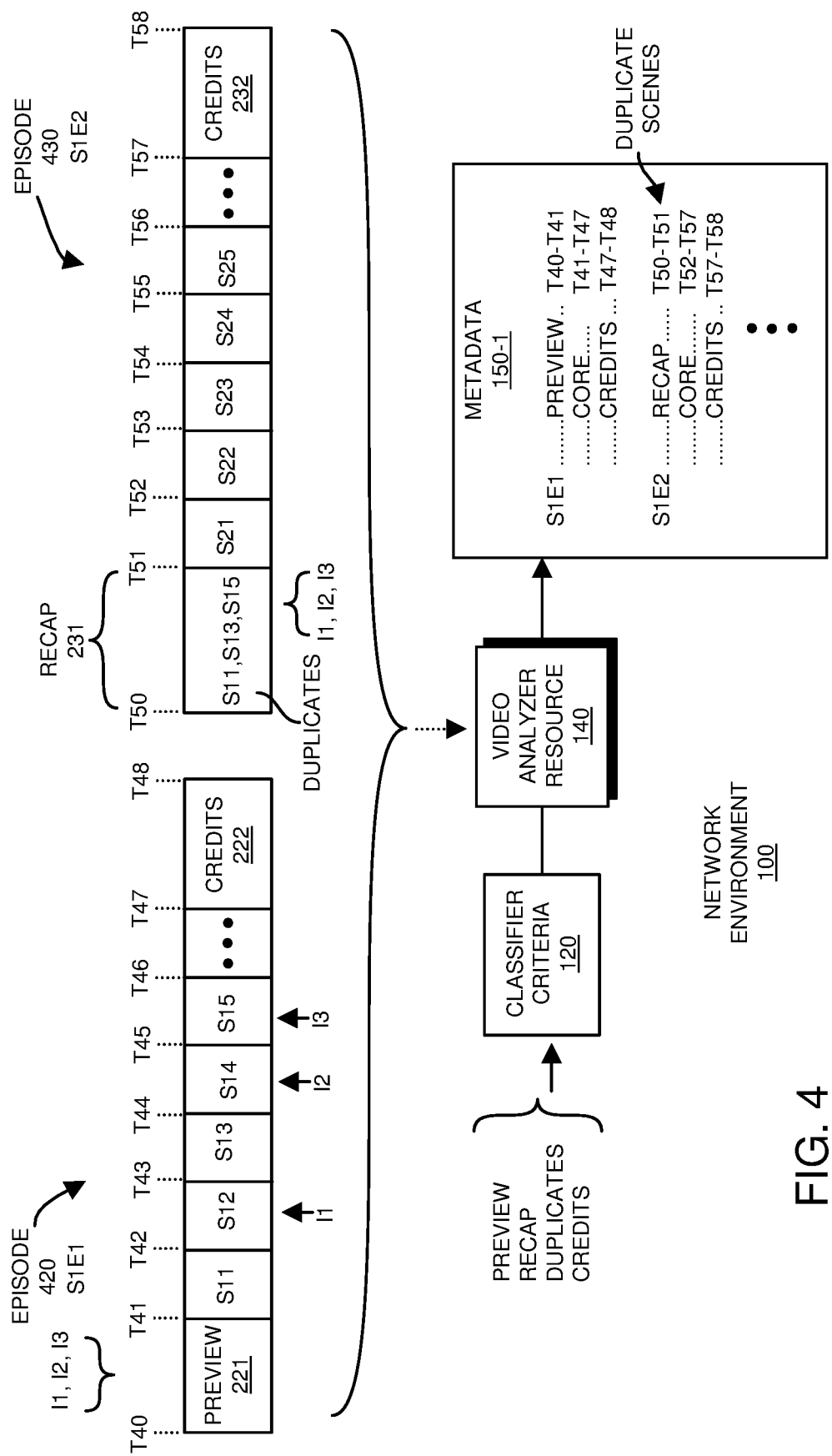
FIG. 4 is an example diagram illustrating generation of metadata based on analysis of one or more video episodes according to embodiments herein.

FIG. 4 is an example diagram illustrating generation of metadata based on analysis of one or more video episodes according to embodiments herein.

Further embodiments herein include a video analyzer resource 140 (and/or video distribution resource) that applies scene classification criteria 120 to an episode of video content from a title of content series such as season S1.

In one embodiment, the scene classification criteria 120 specify different scenes of interest (such as images, audio, etc.) or not if interest to a user.

During application of the scene selection criteria 120 to the video content in season 1, in a similar manner as previously discussed, the video analyzer resource 140 delineates timing of different segments in each episode of video content for playback. The video analyzer resource 140 produces metadata 150-1 classifying the different segments in the episode of video content.

More specifically, the video analyzer resource 140 detects that the episode 420 includes images I1, I2, I3, etc., in the segment between T40 and T41. The video analyzer resource 140 also detects that the image I1 is present in scene S12 between time T42 at time T43; the video analyzer resource 140 also detects that the image I2 is present in scene S14 between time T44 at time T45; the video analyzer resource 140 also detects that the image I3 is present in scene S15 between time T45 at time T46.

The video analyzer resource 140 tags segment T40 to T41 as being a PREVIEW of content in episode 420 in response to detecting that the duplicate images I1, I2, and I3 occur in a smaller window (duration) of time (such as between time T40 and T41 such as 60 seconds) than the images I1, I2, and I3 present in the time range T42 to T46 (second window of time such as 20 minutes). In other words, the duplicate images I1, I2, and I3 are more densely present in the preview 221 window of time than in the corresponding subsequent scenes S12, S14, and S15 which are spaced farther apart in time.

Additionally, note that the video analyzer resource 140 determines that the images I1, I2, and I3 represents a preview of the episode 420 because they are located at the beginning of the episode 420 before scenes S12, S14, and S15 including such images.

If desired, the respective user can specify to skip over the identified PREVIEW 221 because it includes duplicate content.

In this example embodiment, the video analyzer resource 140 receives classifier criteria 120 indicating video content types such as preview, recap, duplicates, and credits. In one embodiment, the classifier criteria 120 is scene selection criteria or filter criteria specifying different types of scenes associated with the episodes 420, 430, etc.

As shown, based on the classifier criteria 120, the video analyzer resource 140 produces metadata 150-1 indicating segments of video content in the multiple episodes 420, 430, etc., including the different types of scenes.

More specifically, in this example embodiment, the video analyzer resource 140 detects presence of: i) recap or preview information 221 present in the time segment in episode 420 starting at time T40 and ending at time T41; ii) core scene S11 in the time segment in episode 420 starting at time T41 and ending at time T42; iii) core scene S12 in the time segment in episode 420 starting at time T42 and ending at time T43; iii) core scene S13 in the time segment in episode 420 starting at time T43 and ending at time T44; and so on.

Further in this example embodiment, the video analyzer resource 140 detects that the episode 430 also includes images I1, I2, I3, etc., in the segment between T50 and T51. As previously discussed, the video analyzer resource 140 also detected that the image I1 is present in scene S12 between time T42 and time T43 in the prior episode S1E1; the video analyzer resource 140 also detected that the image I2 is present in scene S14 between time T44 at time T45 in the prior episode S1E1; the video analyzer resource 140 also detected that the image I3 is present in scene S15 between time T45 at time T46 in the prior episode S1E1.

The video analyzer resource 140 tags segment T50 to T51 as being a preview of content in episode 420 in response to detecting that the duplicate images I1, I2, and I3 occur in a smaller window (duration) of time T50 to T51 than the images I1, I2, and I3 present in the time range (window of time) T42 to T46 in episode S1E1. In other words, in one embodiment, in a similar manner as previously discussed, the duplicate images I1, I2, and I3 in between time T50 and T51 are more densely present in the recap 231 of episode S1E2 than in the corresponding prior scenes S12, S14, and S15 in episode S1E1 which are spaced farther apart in time. Additionally, the video analyzer resource 140 determines that the images I1, I2, and I3 represents a preview or recap of the episode 420 because they are located at the beginning of the episode 430.

Thus, in one embodiment, the video analyzer resource 140 produces the metadata 150-1 to classify the different segments in the one or more episodes of video content.

As previously discussed, tagging of the segments is useful because the user can skip over undesirable segments such as preview 221, credits 222, recap 231, etc.

In accordance with further example embodiments, the video analyzer resource 140 receives input from a user (such as a subscriber operating a respective video playback resource 161) indicating scenes of interest (or segments to filter out such as preview, credits, recap, etc.) in the one or more episodes of video content. The video analyzer resource 140 and/or video distribution resource 141 utilizes the metadata 150-1 to control playback of the episodes of video content on a playback device.

For example, in one embodiment, controlling playback of the episodes of video content on the playback device includes, via the metadata 150-1, identifying first scenes in the episode of video content that match a type of scene of interest (or scenes to filter out) as specified by the input from the user. As further shown in FIG. 5 below, a respective playback device sequentially plays back the identified multiple scenes in the episode of video content on a display screen, skipping playback of scenes (segments) not specified by the input. In one embodiment, the video analyzer resource 140 produces playback control information (such as a playlist 170-1 in FIG. 5) from the metadata 150-1; the playback control information (playlist 170-1) indicates one or more non-contiguous scenes in the episode of video content to playback on a playback device.

Figure 5:
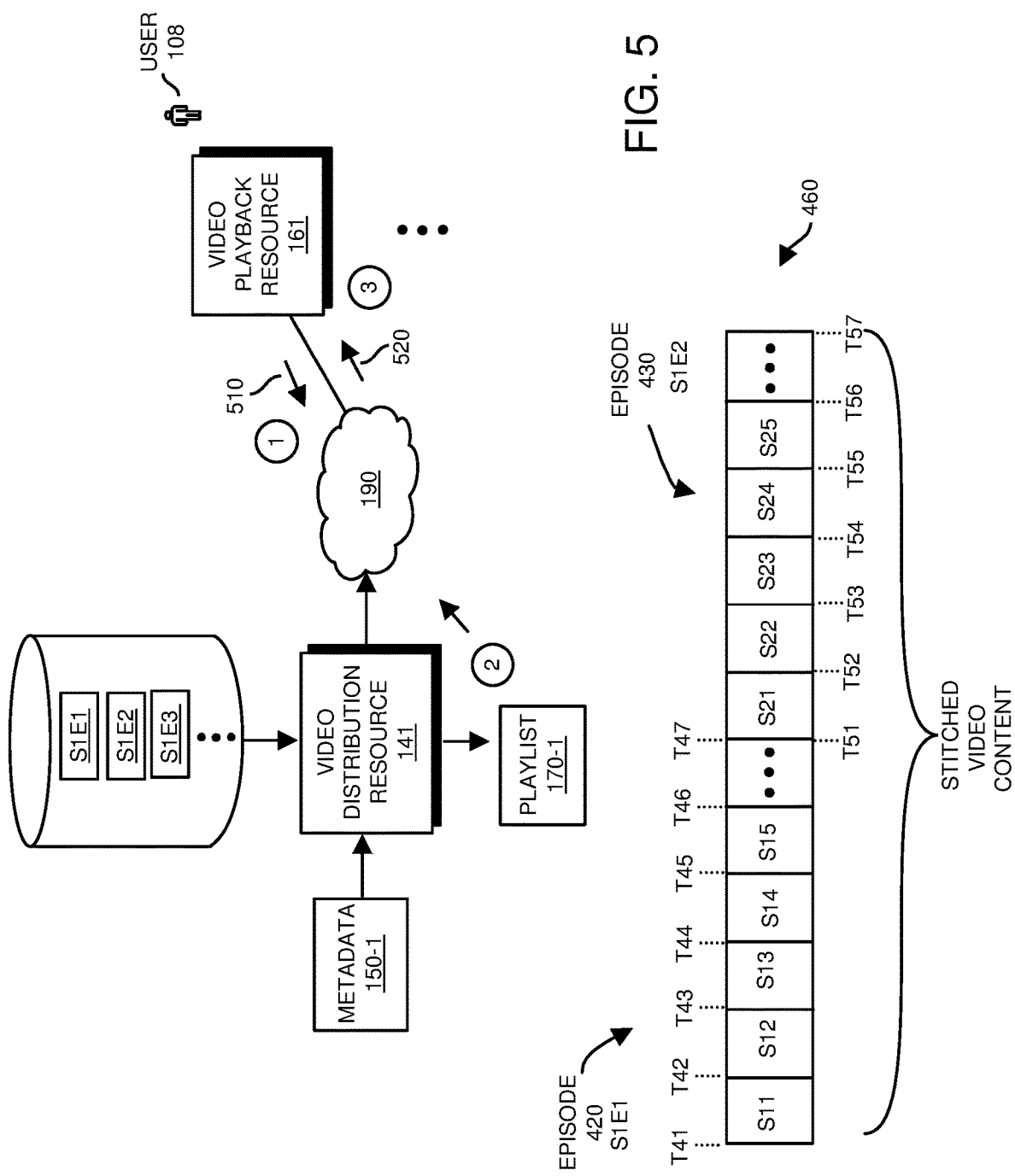
FIG. 5 is an example diagram illustrating generation of a video stream communicated to a playback device for playback based on according to embodiments herein.

FIG. 5 is an example diagram illustrating generation of a video stream communicated to a playback device for playback based on according to embodiments herein.

As shown, based on the metadata 150-2, the video distribution resource 141 distributes requested content over network 190 to the video playback resource 161.

More specifically, assume that the video playback resource 161 generates a request 510 for playback of content of interest such as playback of only scenes in the episodes 420, 430, etc., that do not include a preview, recap, or credits information because the user operating the video playback resource 161 has no interest in viewing such information. In other words, the viewer would like to binge watch episodes in season S1.

In such an instance, in response to receiving the request 510, the video distribution resource 141 uses metadata 150-1 to identify scenes of interest as specified by the request 510 such as only core scenes S11, S12, S13, etc., of multiple episodes 420, 430, etc.

Based on the identified scenes of interest (such as filter criteria) as specified by the request 510, using metadata 150-1, the video distribution resource 141 generates the playlist 170-1 indicating the different segments of video content to stitch together to satisfy the request 510.

For example, based on the metadata 150-1 and filtering out PREVIEW/RECAP, CREDITS information, the video distribution resource 141 identifies scenes in first episode 420 including core scenes S11, S12, S13, etc. between times T41 and T47 of episode 420 for playback. The video distribution resource 141 also identifies scenes in the second episode 430 including scenes S21, S22, S23, etc., between times T51 and T57 on episode 430 for playback. Via filtering out of desirable video content (preview information 221, credits 222, recap 231, credits 232, etc.) in multiple episodes, the video distribution resource 141 produces the playlist 170-1 to indicate segments S11, S12, S13, . . . , S21, S22, S23, etc., for playback in a multiple episode stitched video stream 460, satisfying the need to binge watch the selected sequential episodes.

Figure 6:
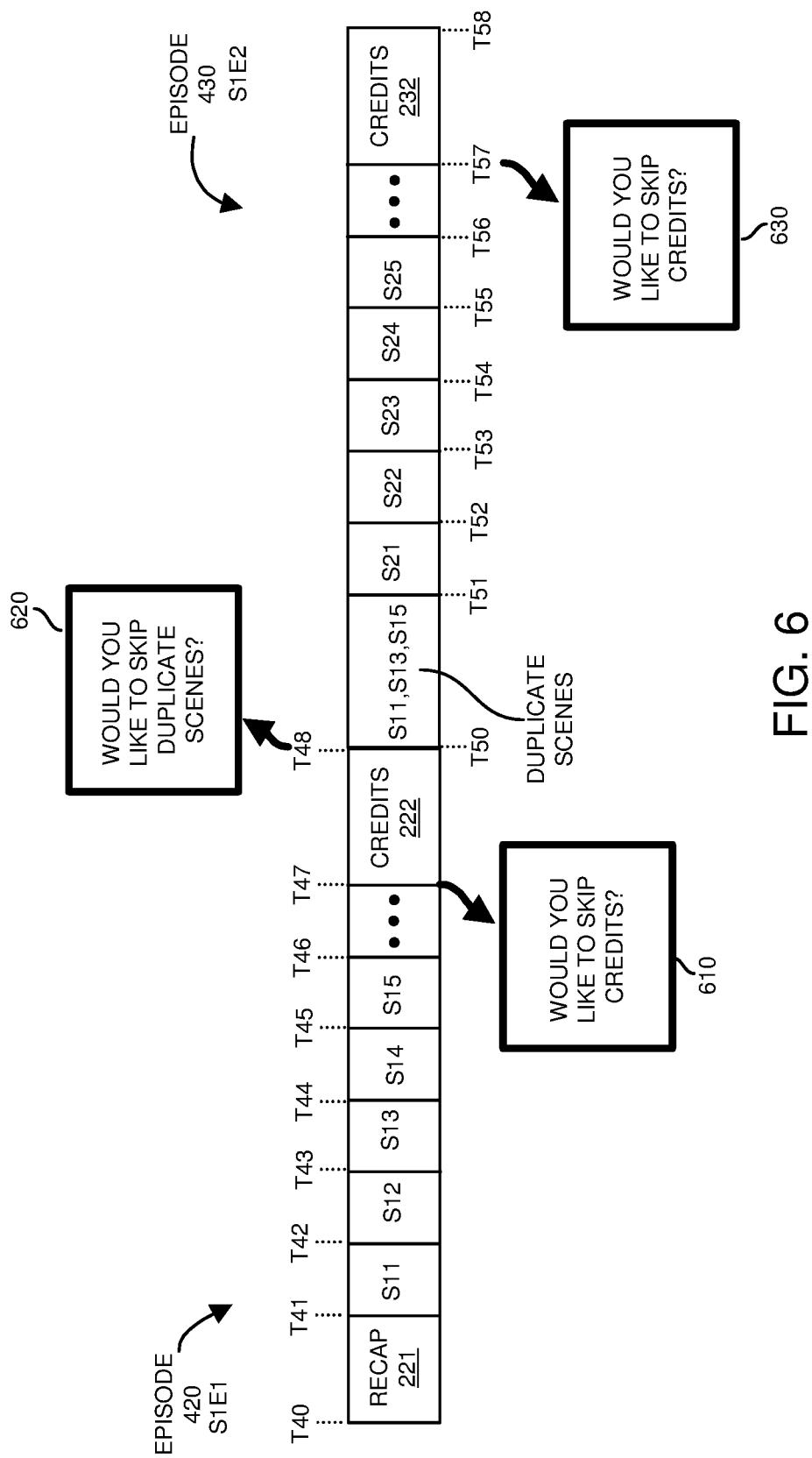
FIG. 6 is an example diagram illustrating display of control notifications during playback of one or more episodes of video content according to embodiments herein.

FIG. 6 is an example diagram illustrating display of control/playback notifications during playback of one or more episodes of video content according to embodiments herein.

As previously discussed, the system as described herein further includes video distribution resource 141 (such as video distribution hardware and/or video distribution software). In such an instance, the video distribution resource distributes the metadata 150 and/or a respective playlist 170 of requested portions of video content segments to the user operating the video playback resource 161.

In one embodiment, during playback of selected portions of the first episode of video content S1E1 followed by playback of selected portions of the second episode of video content S1E2 on the video playback resource 161 (playback device), the video playback resource 161 displays a message to the user indicating whether to skip a segment of video content that may not be of interest such as credits, duplicate scenes in the second episode, etc. Thus, in one embodiment, the displayed message 610 requests the user (operating a video playback resource) to provide input indicating whether to skip over a portion of the first episode of video content.

In response to display of the message 610 on a respective display screen, assume that the user operating the video playback resource 161 provides input to the video playback resource 161 to skip the credits 222. In such an instance, the video playback resource 161 skips playback of the credits 222 and starts playing back the segments of video content at time T50 associated with the episode 430.

In response to detecting duplicate scenes present in the episode 430 as indicated by metadata 150-1, the video playback resource 161 initiates display of the message 620 to the corresponding user operating the video playback resource 161. If the user is uninterested in playing back the duplicate scenes from the prior episode 420, the user of the video playback resource 161 enters a command (such as via a remote control device in communication with the video playback resource and/or video distribution resource) notifying the video playback resource 161 and corresponding video distribution resource 141 to skip playing back of the duplicate scenes such as those between time T50 and time T51 of the episode 430. In such an instance, the video playback resource 161 skips the video segment of duplicate scenes and initiates playback of the episode 430 at time T51.

Thus, embodiments herein include providing a respective user an ability to skip the different types of video content in multiple episodes.

Figure 7:
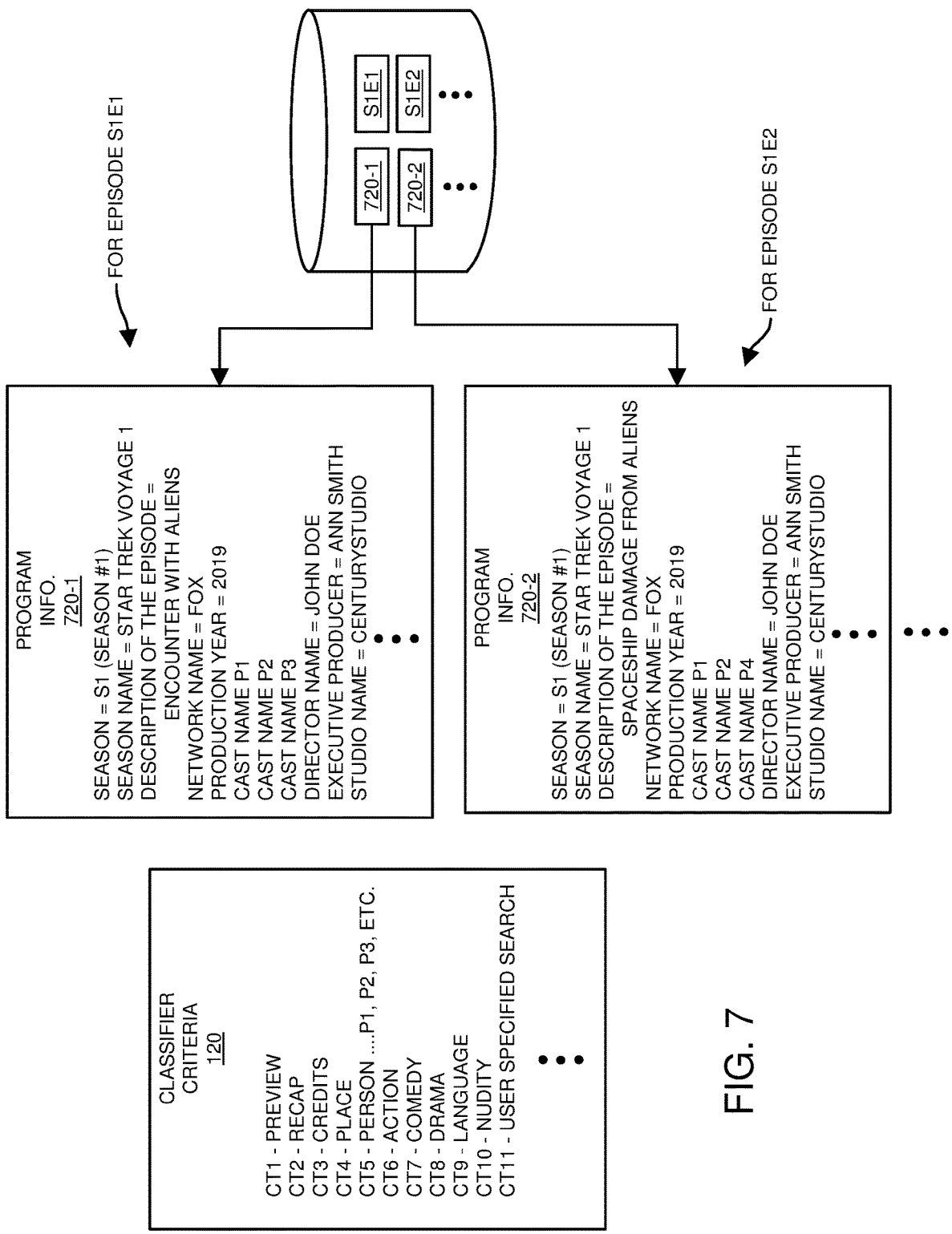
FIG. 7 is an example diagram illustrating use of selectable classifier criteria to control generation of metadata to control playback of different portions of video content from multiple episodes according to embodiments herein.

FIG. 7 is an example diagram illustrating use of classifier criteria to control generation of metadata to control playback of different portions of video content from multiple episodes according to embodiments herein.

In accordance with further example embodiments, the repository 180 stores additional metadata associated with each episode. In one embodiment, the additional metadata is program information 720 (such as program information 720-1 associated with episode S1E1, program information 720-2 associated with episode S1E2, program information 720-3 associated with episode S1E3, etc.).

The program information 720 includes any suitable information. For example, in one embodiment, the program information 720-1 includes information such as a season identifier (season #1 in this case) to which the episode S1E1 pertains; the program information 720-1 includes information such as a season name (Star Trek Voyage 1) to which the episode S1E1 pertains; the program information 720-1 includes information such as a title and/or descriptive summary of the episode S1E1; the program information 720-1 includes information such as a name of the network airing the program; the program information 720-1 includes information indicating a year that the episode S1E1 was produced; the program information 720-1 includes information such as names of different cast members P1, P2, P3, etc.; the program information 720-1 includes information such as a name of director (John Doe) associated with episode S1E1; the program information 720-1 includes information such as a name of the executive producer (Ann Smith) associated with episode S1E1; the program information 720-1 includes information such as a studio name (Century Studio) associated with episode S1E1; etc.

In a similar manner, program information 720-2 associated with episode S1E2 can include similar information such as season (season #1 in this case) to which the episode S1E2 pertains; the program information 720-2 includes information such as a season name (Star Trek Voyage 1) to which the episode S1E2 pertains; the program information 720-2 includes information such as a description or title of the episode S1E2; the program information 720-2 includes information such as a name of the network airing the program; the program information 720-2 includes information indicating a year that the episode S1E2 was produced; the program information 720-2 includes information such as names of different cast members P1, P2, P3, etc.; the program information 720-2 includes information such as a name of director (John Doe) associated with episode S1E2; the program information 720-2 includes information such as a name of the executive producer (Ann Smith) associated with episode S1E2; the program information 720-2 includes information such as a studio name (Century Studio) associated with episode S1E2; etc.

As previously discussed, the classifier criteria 120 used by the video analyzer resource 140 to classify different segments (portions) of the analyzed one or more episodes of video content can be any suitable information.

In one embodiment, the classifier criteria 120 includes attributes of the video content to be marked using respective metadata 150. For example, the classifier criteria 120 includes a classifier value of CT1 to tag a preview associated with respective video content. The preview can be any suitable information such as video content at the beginning of a particular episode what will be shown later in more detail in the core of the particular episode.

Classifier criteria 120 includes a classifier value of CT2 to tag a recap associated with respective video content. The recap (summary, recapitulation, copy of scenes, etc.) can be any suitable information such as scenes in a first episode of video content that appear as scenes at the beginning of a second episode of video content to give the user a background understanding of the first episode on which the next contiguous (second) episode (in the sequence) is based.

Classifier criteria 120 includes a classifier value of CT3 to tag credits associated with respective video content. The credits (such as names of actors, producers, etc.) can be any suitable information typically at the beginning or end of the respective episode. One way to identify credit information is text displayed in the corresponding video content segment. For example, as previously discussed, every network provides program information 720 about each season/episode in an appropriate format such as an XML file. This program information 720 includes information such as season name, episode name, description of the episode, network name, production year, cast, director, studio, etc. In one embodiment, the program information 720 is potentially displayed to a respective user when viewing attribute information of the episode in a video on demand catalog (e.g., program guide).

Note that further embodiments herein include using text, symbol, image, etc., information in the program information 720 for each episode as a guide to determining the start/stop time of segments and corresponding classification of such segments in each episode. More specifically, assuming person P1 is Liev Schrieber, and if the video analyzer resource 140 detects texts from program information 720 such as "Starring Liev Schrieber" in images of a respective segment of the episode, then the video analyzer resource 140 tags that segment as a Recap (Preview) segment of respective episode S1E1. If the video analyzer resource 140 detects texts such as "Executive Producer Ann Smith" in a respective segment of the episode S1E1, then the video analyzer resource 140 tags that respective segment as the beginning of the Credits segment of episode S1E1.

In a similar manner, any of the text, images, symbol, etc., in the program information 720 can be used to find and tag different segments of video content including renditions of such text, symbols, images, etc.

Classifier criteria 120 includes a classifier value of CT4 (or multiple different classifier values CT4-1, CT4-2, etc.) to tag specific locations (such as geographical location as specified by Summary information in the available program information 720 from the network) to which respective video content pertains.

Classifier criteria 120 includes a classifier value of CT5 (or multiple different classifier values P1, P2, P3, etc.) to tag specific persons (as indicated by the cast identified in the program information 720 from the network or other suitable entity) such as person P1, person P2, person P3, etc., to which respective video content pertains.

Classifier criteria 120 includes a classifier value of CT6 (or multiple different classifier values CT6-1, CT6-2, etc.) to tag specific types of actions (such as fighting, walking, running, sports competition, combat, etc.) associated with persons in the analyzed video content.

Classifier criteria 120 includes a classifier value of CT7 to tag portions of the analyzed video content including funny (humorous) material.

Classifier criteria 120 includes a classifier value of CT8 to tag drama (dramatic) portions of the analyzed video content.

Classifier criteria 120 includes a classifier value of CT9 to tag language (such as swearing, cursing, or other inappropriate language) of the analyzed video content.

Classifier criteria 120 includes a classifier value of CT10 to tag scenes in the video content (such as where nudity, adult content, etc., is detected) of the analyzed video content.

Classifier criteria 120 includes a classifier value of CT11 to tag scenes in the video content including content attributes as specified by the user in a free form search. For example, the user (viewer) associated with a respective playback resource requesting playback of respective portions of video content can input custom text, symbols, images, etc., indicating the scenes to be identified in the one or more episodes of video content that are of interest or not of interest. In such an instance, the classifier criteria 120 includes any descriptive matter such as text, symbols, audio signals, etc., to identify video content of interest.

As a more specific example, the user can input text such as "catching fish." In such an instance, the video analyzer resource 140 analyzes the corresponding images and/or audio associated with the multiple episodes of video content to identify and mark, via metadata 150, the portions of the video content including catching a fish.

In yet further example embodiments, the user can input text identifying one or more scenes of interest. For example, the user can input search criteria including multiple search terms such as white house, picnic, and Jane. In such an instance, the video analyzer resource analyzes the corresponding images and/or audio associated with the multiple episodes of video content identify and mark, via metadata 150, segments of the video content including the actor Jane attending a picnic at a white house.

In still further example embodiments, the user can select a particular person or multiple persons of interest in the episodes of video content. In such an instance, the video analyzer resource 140 analyzes the respective episodes of video content to identify and mark, via metadata 150, segments of content pertaining to the identified particular person of interest. This is further shown in FIG. 8.

Figure 8:
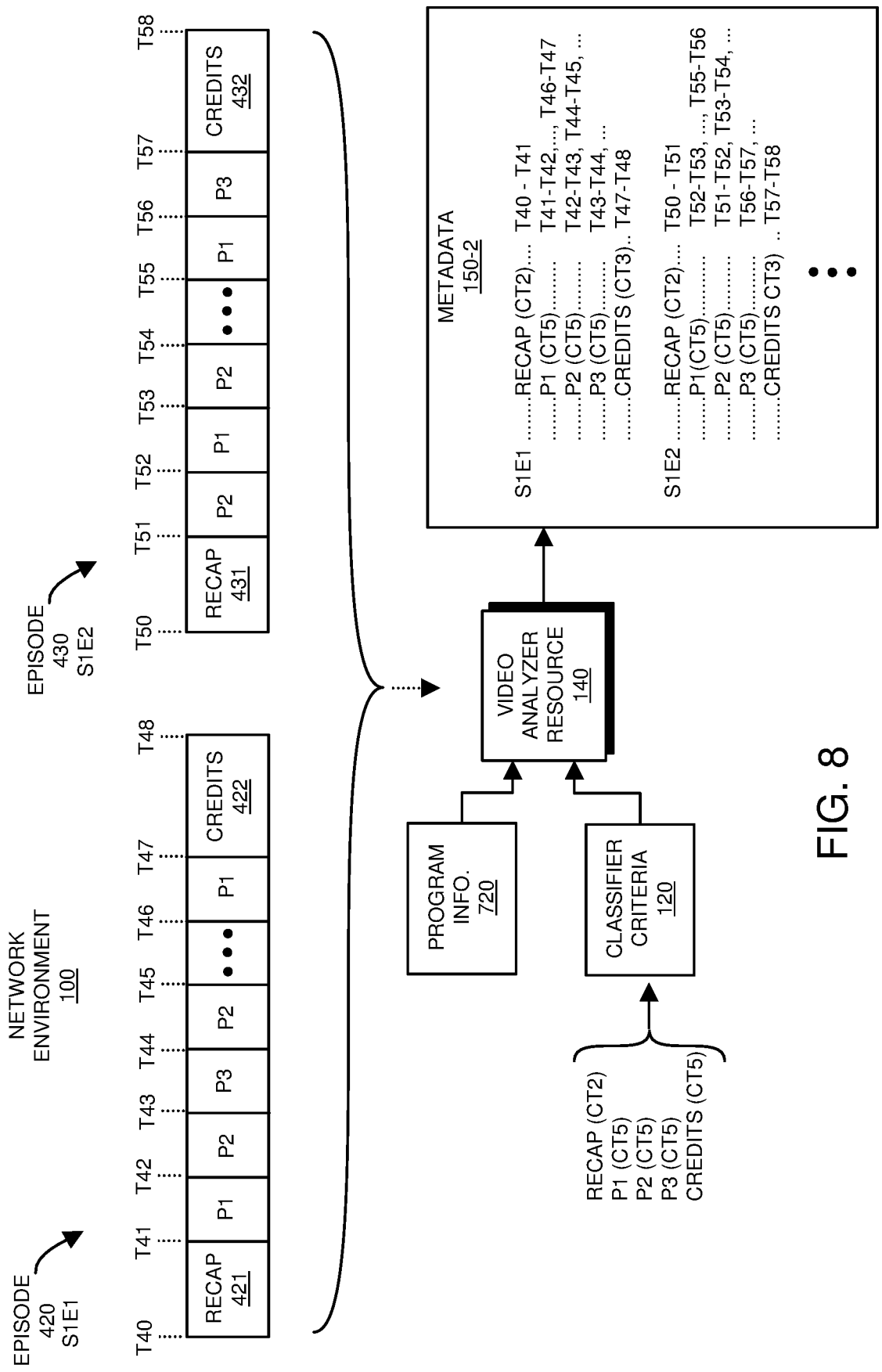
FIG. 8 is an example diagram illustrating generation of metadata indicating different types of content present in one or more video episodes according to embodiments herein.

FIG. 8 is an example diagram illustrating generation of metadata indicating different types of content present in one or more video episodes according to embodiments herein.

In this example embodiment, the video analyzer resource 140 receives classifier criteria 120. In one embodiment, the classifier criteria 120 is scene selection criteria specifying different types of scenes (such as recap, scenes including person P1, scenes including person P2, scenes including person P3, etc.) associated with the episodes 420, 430, etc.

As shown, based on the classifier criteria 120 and/or the program information 720, the video analyzer resource 140 produces metadata 150-2 indicating segments of video content in the multiple episodes 420, 430, etc., including the different types of scenes. In one embodiment, as previously discussed, use of the program information 720 includes identifying the different types of segments of video content in each episode being analyzed based on presence of text, images, etc., (as indicated by with the program information 720) in the respective video segments. For example, the video analyzer resource 140 detects presence of a credit information at an end of an episode based on detecting presence of credit information such as text indicating director John Doe, Executive Producer Ann Smith, etc., in the video segments.

More specifically, the video analyzer resource 140 detects presence of: i) recap or preview information 421 (such as including "Starring Liev Schrieber" in images) present in the time segment in episode 420 starting at time T40 and ending at time T41; ii) a scene including person P1 present in the time segment in episode 420 starting at time T41 and ending at time T42; iii) a scene including person P2 present in the time segment in episode 420 starting at time T42 and ending at time T43; iv) a scene including person P3 present in the time segment in episode 420 starting at time T43 and ending at time T44; iv) a scene including person P2 present in the time segment in episode 420 starting at time T44 and ending at time T45; . . . xi) recap information 431 (such as including "Starring Liev Schrieber" in images) present in the time segment in episode 430 starting at time T50 and ending at time T51; xii) a scene including person P2 present in the time segment in episode 430 starting at time T51 and ending at time T52; xiii) a scene including person P1 present in the time segment in episode 430 starting at time T52 and ending at time T53; xiv) a scene including person P2 present in the time segment in episode 430 starting at time T53 and ending at time T54; and so on.

As previously discussed, metadata 150-2 indicates the classification of content segments.

Figure 9:
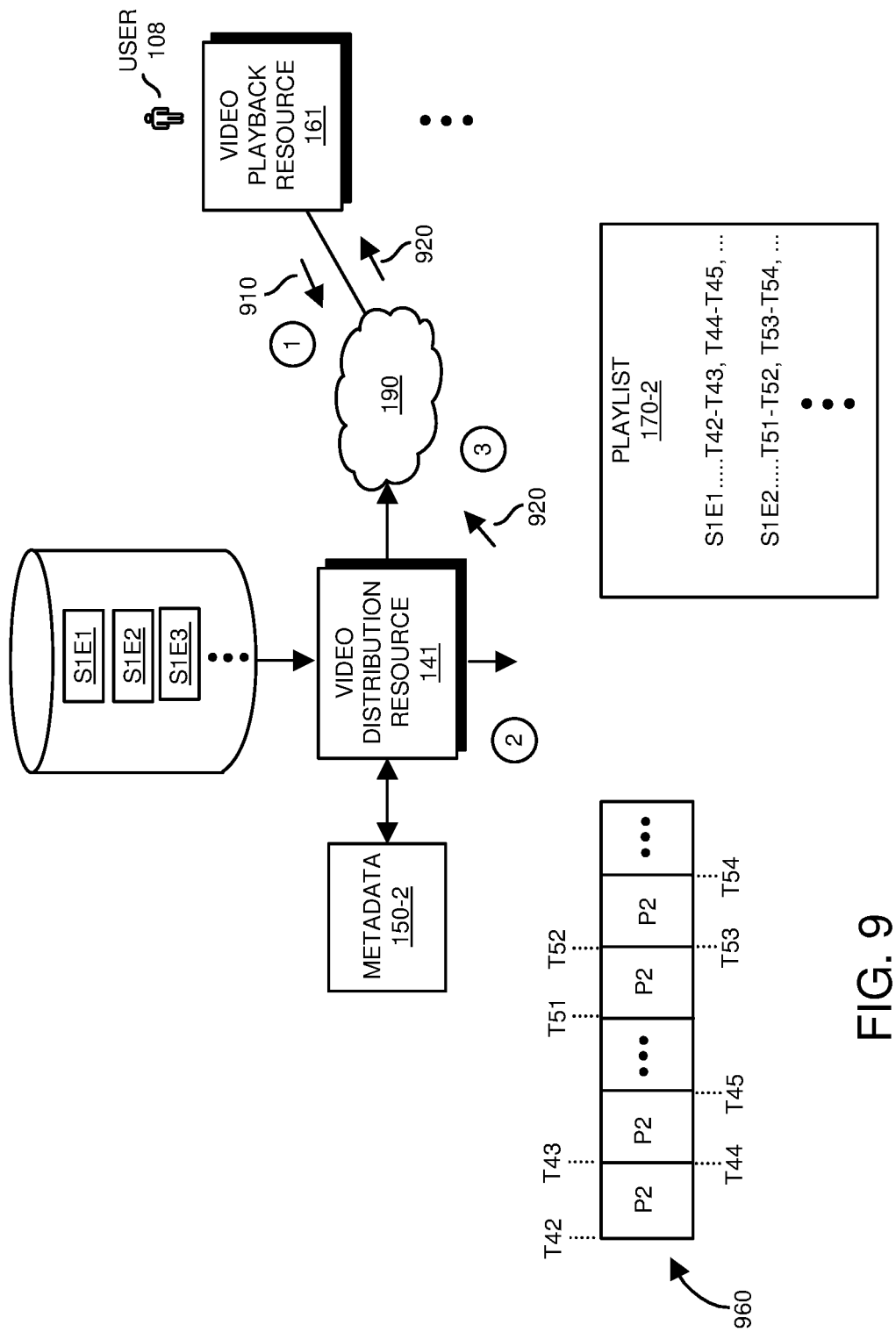
FIG. 9 is an example diagram illustrating generation and playback of video content according to embodiments herein.

FIG. 9 is an example diagram illustrating generation and playback of video content according to embodiments herein.

As shown, based on the metadata 150-2, the video distribution resource 141 distributes requested content over network 190 to the video playback resource 161.

More specifically, assume that the video playback resource 161 and user generates a request 910 for playback of content of interest such as only scenes in the episodes 420, 430, etc., that include person P2 because the user operating the video playback resource 161 has no interest in viewing recap information, credits, person P1, person P3, etc.

In such an instance, in response to receiving the request 910 for P2 content, the video distribution resource 141 uses metadata 150-2 to identify scenes of interest as specified by the request 910 such as only scenes of multiple episodes 420, 430, etc., of a respective series of video content that include person P2.

Based on the identified scenes of interest (such as filter criteria) as specified by the request 910, and using metadata 150-2, the video distribution resource 141 generates the playlist 170-1 indicating the different segments of video content to stitch together to satisfy the request 910. For example, based on the metadata 150-2, the video distribution resource 141 identifies scenes in episode 420 including P2 between times T42 and T43, times T44 and T45, etc., for playback. The video distribution resource 141 identifies scenes in episode 430 including P2 between times T51 and T52, times T53 and T54, etc. The video distribution resource 141 produces the playlist 170-1 to indicate these segments for playback in a video stream 960.

Note that the video distribution resource 141 can be configured to distribute the respective video stream 960 in any suitable manner.

For example, in one embodiment, the video distribution resource 141 communicates the playlist 170-1 over the network 190 to the video playback resource 161. In such an instance, the video playback resource 161 uses the playlist 170-1 to retrieve the identified segments of content in the video stream 960 as specified by the playlist 170-1.

More specifically, in accordance with the playlist 170-1, the video playback resource 161 first requests contiguous playback of the corresponding segment of content between time T42 and time T43 in the episode 420 for playback; the video playback resource 161 then requests playback of a next identified segment of content between time T44 and time T45 in the episode 420 for playback; and so on.

In accordance with the playlist 170-1, the video playback resource 161 further requests playback of the corresponding segment of content between time T51 and time T52 in the episode 420 for playback; the video playback resource 161 then requests playback of a next identified segment of content between time T53 and time T54 in the episode 420 for playback; and so on.

In this manner, the video playback resource 161 retrieves only scenes of interest.

Alternatively, note that the video distribution resource 141 can be configured to transmit the respective video stream 960 (such as in a transport stream) over the network 190 to the video playback resource 161 without receiving individual segment requests from the video playback resource 161.

Figure 10:
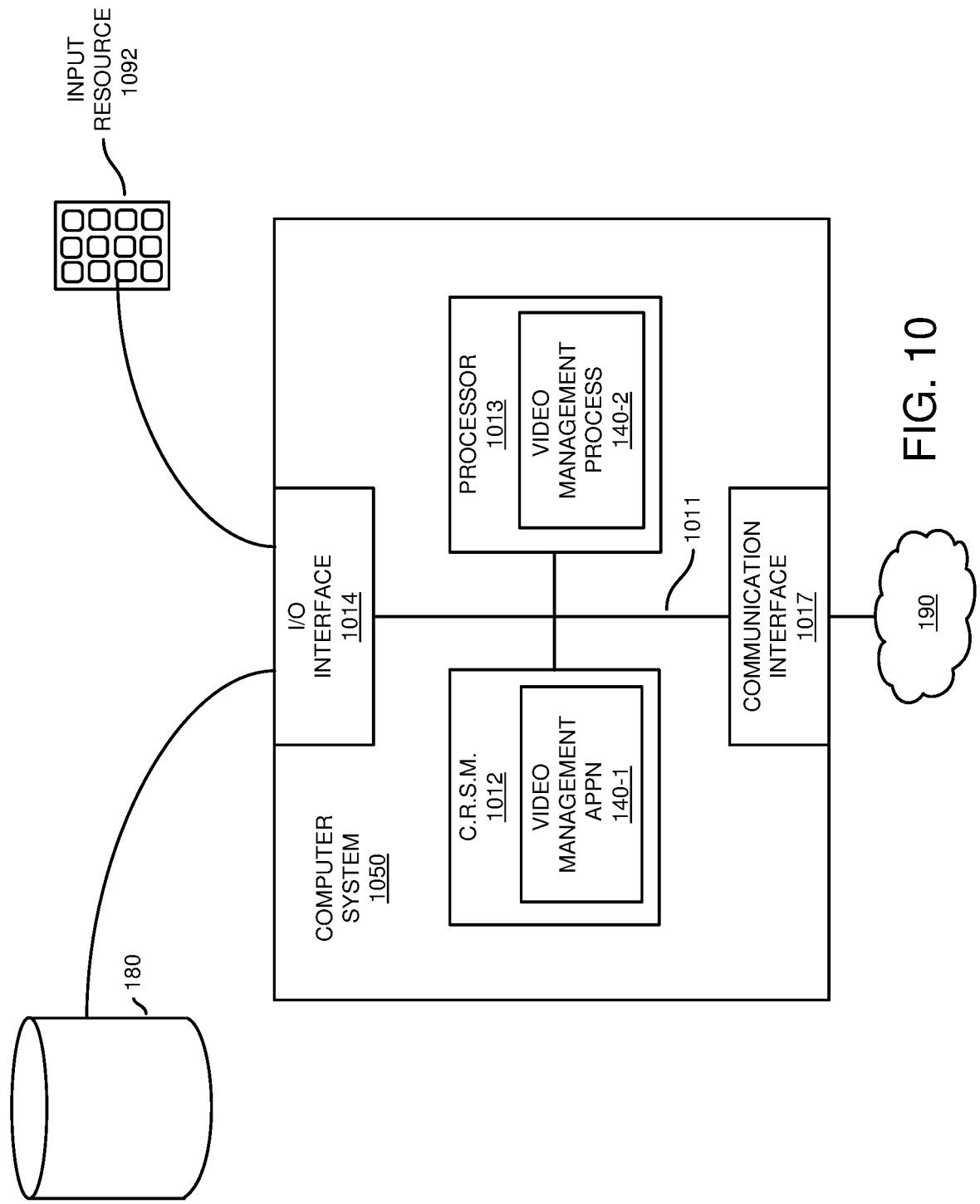
FIG. 10 is an example diagram illustrating a computer architecture in which to execute one or more embodiments as discussed herein.

FIG. 10 is an example block diagram of a computer system for implementing any of the operations as discussed herein according to embodiments herein.

Any of the resources (e.g., video playback resource, video analyzer resource, video distribution resource, etc.) can be configured to include a processor and executable instructions to carry out the different operations as discussed herein.

As shown, computer system 1050 of the present example can include an interconnect 1011 that couples computer readable storage media 1012 such as a non-transitory type of media (i.e., any type of hardware storage medium) in which digital information can be stored and retrieved, a processor 1013 (computer processor hardware), I/O interface 1014, and a playbacks interface 1018.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with video management application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in video management application 140-1 (such as instantiation of video analyzer resource 140, video distribution resource, playback resources 161, 162, etc.) stored on computer readable storage medium 1012. Execution of the video management application 140-1 produces video management process 140-2 to carry out any of the operations and/or processes as discussed herein.

Those skilled in the art will understand that the computer system 1050 can include other processes and/or software and hardware components, such as an operating system that controls allocation and use of hardware resources to content management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc.

The computer system 1050 may reside at any location or can be included in any suitable resource in any network environment to implement functionality as discussed herein.

Functionality supported by the different resources will now be discussed via flowcharts in FIGS. 11-12. Note that the steps in the flowcharts below can be executed in any suitable order.

Figure 11:
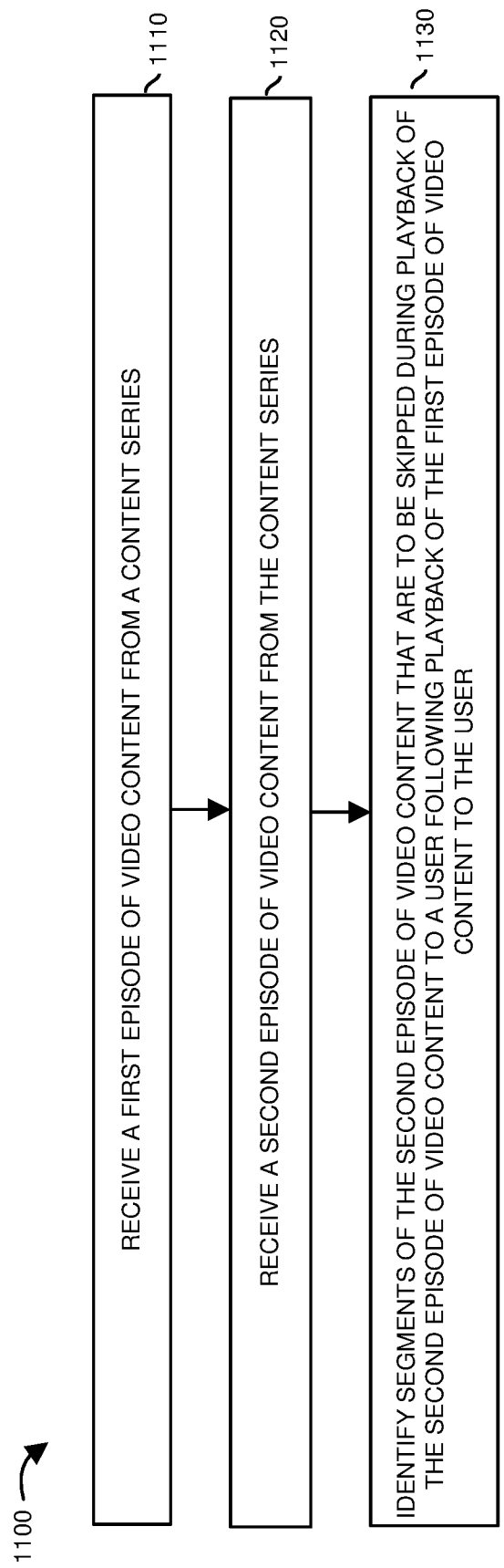
FIG. 11-12 are example diagrams illustrating various methods according to embodiments herein.

FIG. 11 is a flowchart 1100 illustrating an example method according to embodiments. Note that there will be some overlap with respect to concepts as discussed above.

In processing operation 1110, the video analyzer resource 140 receives and analyzes a first episode of video content from a content series.

In processing operation 1120, the video analyzer resource 140 receives and analyzes a second episode of video content from the content series.

In processing operation 1130, the video analyzer resource 140 identifies segments of the second episode of video content that are to be skipped during playback of the second episode of video content to a user following playback of the first episode of video content to the user.

Figure 12:
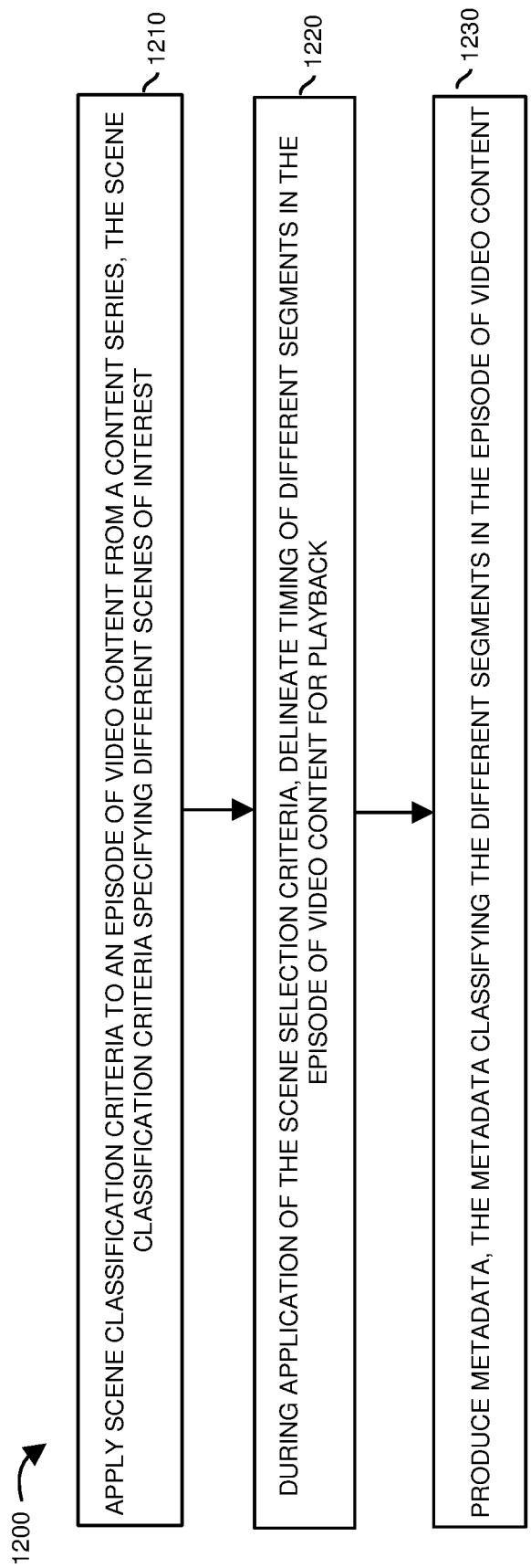

FIG. 12 is a flowchart 1200 illustrating an example method according to embodiments. Note that there will be some overlap with respect to concepts as discussed above.

In processing operation 1210, the video analyzer resource 140 applies scene classification criteria to an episode of video content from a content series, the scene classification criteria specifying different scenes of interest.

In processing operation 1220, during application of the scene selection criteria, the video analyzer resource 140 delineates timing of different segments in the episode of video content for playback.

In processing operation 1230, the video analyzer resource 140 produces metadata, the metadata classifying the different segments in the episode of video content.

Note again that techniques herein are well suited to control playback of content. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
    receiving a first episode of video content from a content series;
    receiving a second episode of video content from the content series;
    analyzing the first episode and the second episode;
    identifying segments of the second episode of video content that are to be skipped during playback of the second episode of video content to a user following playback of the first episode of video content to the user; and adjusting respective start/stop time boundaries of the identified segments of the second episode that are to be skipped based on playback commands applied to the video content during playback.

2. The method as in claim 1 further comprising:

receiving scene selection criteria specifying a particular type of video content to be skipped during playback of the second episode of video content following playback of the first episode of video content;

detecting portions of the second episode of video content that are of a type as specified by the scene selection criteria; and producing a playlist, the playlist excluding playback of the portions of the second episode of video content to be skipped during playback of the second episode of video content following playback of the first episode of video content.

3. The method as in claim 1 further comprising:

during playback of the first episode of video content followed by the second episode of video content, displaying a message to the user, the message requesting the user to provide input indicating whether to skip over a portion of the first episode of video content.

4. The method as in claim 1 further comprising:

receiving feedback of playback commands applied to playback of the second episode of video content; and utilizing the feedback of applied playback commands to modify timing of identified segments of content in the second episode to be skipped during playback.

5. The method as in claim 1 further comprising:

producing metadata specifying a first segment of content in the first episode of video content to be skipped during playback of the first segment of content; and producing a confidence value indicating a degree to which a start time associated with the first segment of content represents video content of a particular type.

6. The method as in claim 5 further comprising:

receiving feedback indicating timing of playback commands applied to the second episode of video content during playback; and based on the received feedback, adjusting a magnitude of the confidence value.

7. The method as in claim 1 further comprising:

producing metadata to indicate attributes of each of the segments of content in the first episode of video content and the second episode of video content to be skipped.

8. A method comprising:

receiving scene classification criteria, the scene classification criteria specifying different types of physical entities;

applying the scene classification criteria to video content;

based on the application of the scene classification criteria, determining start/stop timing of different segments of the video content including images of the different types of physical entities as specified by the scene classification criteria; and producing metadata, the metadata classifying the different segments of the video content including the images of the different types of physical entities.

9. The method as in claim 8 further comprising:

receiving input from a user indicating a physical entity of interest in the video content; and utilizing the metadata to control playback of the video content on a playback device.

10. The method as in claim 9, wherein utilizing the metadata to control playback of the video content on the playback device includes:

via the metadata, identifying first scenes in the video content that include the physical entity of interest as specified by the input from the user; and sequentially playing back the identified first scenes in the video content on a display screen, skipping playback of scenes in the video content that do not include the physical entity of interest.

11. The method as in claim 8 further comprising:

producing playback control information from the metadata, the playback control information indicating non-contiguous scenes in the video content to playback on a playback device.

12. The method as in claim 8 further comprising:

producing the metadata to classify the different segments of the video content, the classification indicating which of the images of the different types of physical entities are captured in the different segments of the video content.

13. A system comprising:

video analyzer hardware operative to:
 receive a first episode of video content from a content series;
 receive a second episode of video content from the content series;
 analyze the first episode and the second episode;
 via metadata derived from the video content, identifying segments of the second episode of video content that are to be skipped during playback of the second episode of video content to a user following playback of the first episode of video content to the user; and
 adjust respective start/stop time boundaries of the identified segments of the second episode that are to be skipped based on playback commands applied to the video content during playback.

14. The system as in claim 13, wherein the video analyzer hardware is further operative to:

receive scene selection criteria specifying a particular type of video content to be skipped during playback of the second episode of video content followed by playback of the first episode of video content;

detect portions of the second episode of video content that are of a type as specified by the scene selection criteria; and produce the metadata to indicate the portions of the second episode of video content to be skipped during playback of the second episode of video content followed by playback of the first episode of video content.

15. The system as in claim 13 further comprising:

video distribution hardware operative to:
 during playback of the first episode of video content followed by the second episode of video content, display a message to the user, the message requesting the user for input whether to skip over a portion of the first episode of video content.

16. The system as in claim 13, wherein the video analyzer hardware is further operative to:

receive playback commands applied to the second episode of video content during playback; and utilize the playback commands to modify timing of segments as specified by the metadata.

17. The system as in claim 13, wherein the video analyzer hardware is further operative to:

produce the metadata to indicate attributes of each of the segments of content in the first episode of video content and the second episode of video content.

18. Computer-readable storage hardware having instructions stored thereon, the instructions, when carried out by computer processor hardware, cause the computer processor hardware to:
receive a first episode of video content from a content series;
receive a second episode of video content from the content series;
analyze the first episode and the second episode;
identify segments of the second episode of video content that are to be skipped during playback of the second episode of video content to a user following playback of the first episode of video content to the user; and
adjust respective start/stop time boundaries of the identified segments based on playback commands applied to the video content during playback.

19. The method as in claim 1 further comprising:
receiving program information associated with the first episode and the second episode, the program information including text describing the first episode and the second episode; and
utilizing the text from the program information to classify video segments of the first episode and the second episode.

20. The system as in claim 13, wherein the video analyzer resource is further operative to:
receive program information associated with the first episode and the second episode, the program information including text describing the first episode and the second episode; and
utilize the text from the program information to classify video segments of the first episode and the second episode.

21. The method as in claim 8 further comprising:
receiving search input from a user, the search input specifying attributes of a first physical entity; and
via the metadata, determining which of the different segments of video content include an image of the first physical entity.

22. The method as in claim 21 further comprising:
controlling playback of the video content to include segments of the video content including the image of the first physical entity and exclude segments of the video content that do not include the first physical entity.

23. The method as in claim 21, wherein the first physical entity is a particular person as specified by the search input.

24. The method as in claim 8 further comprising:
receiving search input from a user, the search input specifying attributes of a first physical entity and a second physical entity;
via the metadata, determining which of the different segments of video content include a first image of the first physical entity and a second image of the second physical entity.

25. The method as in claim 24 further comprising:
controlling playback of the video content to include segments of the video content including the image of the first image and the second image and exclude segments of the video content that do not include the first image and the second image.

26. The method as in claim 25, wherein the first physical entity is a first person and the second physical entity is a second person.

27. The method as in claim 1 further comprising:
determining presence of a preview of content in the second episode based on detecting that a set of multiple images appear in a smaller window of time in the second episode than in the first episode, the preview of content being a recap of scenes in the first episode.

28. The method as in claim 1 further comprising:
determining a segment of the second episode to skip based on a location of images in the second episode, the images in the second episode being a duplicate of images in the first episode.

29. The method as in claim 1 further comprising:
determining a segment of the second episode to skip based on attributes of text detected in the second episode.

30. The method as in claim 1 further comprising:
receiving search input from a user, the search input specifying attributes of a first physical entity;
via the metadata, determining which of the different segments of video content include an image of the first physical entity; and
controlling playback of the video content to include segments of the video content including the image of the first physical entity and exclude segments of the video content that do not include the first physical entity.

* * * * *